US012702264B2

(12) United States Patent
Demey et al.

(10) Patent No.: US 12,702,264 B2
(45) Date of Patent: Aug. 11, 2026

(54) SHAFT FOR A CLEANING TOOL AND A CLEANING TOOL PROVIDED WITH SUCH A SHAFT

(71) Applicant: MOERMAN NV, Meulebeke (BE)

(72) Inventors: Jordi Demey, Wielsbeke (BE); Guy Vande Vyvere, Wortegem-Petegem (BE)

(73) Assignee: MOERMAN NV, Meulebeke (BE)

( * ) Notice: Subject to any disclaimer, the term of this patent is extended or adjusted under 35 U.S.C. 154(b) by 407 days.

(21) Appl. No.: 18/118,568

(22) Filed: Mar. 7, 2023

(65) Prior Publication Data

US 2023/0309777 A1 Oct. 5, 2023

(30) Foreign Application Priority Data

Mar. 7, 2022 (BE) .................................. 2022/5155

(51) Int. Cl.
*A47L 13/26* (2006.01)
*A47L 13/22* (2006.01)
*A47L 13/42* (2006.01)
*B25G 1/04* (2006.01)

(52) U.S. Cl.
CPC ............... *A47L 13/26* (2013.01); *A47L 13/22* (2013.01); *A47L 13/42* (2013.01); *B25G 1/04* (2013.01)

(58) Field of Classification Search
CPC . B25G 1/04; A47L 13/26; A47L 13/22; A47L 13/42
See application file for complete search history.

(56) References Cited

U.S. PATENT DOCUMENTS

| | | | | | |
|---|---|---|---|---|---|
| 5,593,196 | A * | 1/1997 | Baum | B25J 1/04 | 403/328 |
| 9,475,184 | B2 * | 10/2016 | Balestrieri | B25G 1/04 | |
| 11,084,161 | B2 * | 8/2021 | Everingham | B25G 1/04 | |
| 2011/0002734 | A1 * | 1/2011 | Chen | B25G 3/26 | 403/350 |
| 2011/0016650 | A1 * | 1/2011 | Wang | A47L 13/42 | 15/144.1 |
| 2011/0247157 | A1 * | 10/2011 | Caillou | B25G 1/102 | 15/147.1 |
| 2011/0274481 | A1 * | 11/2011 | Chen | A47L 13/42 | 403/109.1 |

(Continued)

FOREIGN PATENT DOCUMENTS

| | | | | | |
|---|---|---|---|---|---|
| CA | 3086582 | A1 * | 1/2021 | A47L 13/22 |
| CN | 108209775 | A * | 6/2018 | |

(Continued)

*Primary Examiner* — Marc Carlson
(74) *Attorney, Agent, or Firm* — FRESH IP PLC; Clifford D. Hyra; Aubrey Y. Chen

(57) ABSTRACT

Disclosed herein is a telescopic shaft for a cleaning tool, including a first shaft portion and a second shaft portion which are slidably connected to each other, and a spraying device for distributing a liquid cleaning agent. The second shaft portion may have a cross section with a non-circular outer shape, and the spraying device can be removably fastened to the shaft and can be connected to the second shaft portion in such a way that the second shaft portion is rotatable about its longitudinal axis (A) with respect to the first shaft portion and with respect to the spraying device fastened thereto. Also disclosed herein is a cleaning tool provided with such a telescopic shaft.

12 Claims, 5 Drawing Sheets

(56) References Cited

U.S. PATENT DOCUMENTS

| | | | | |
|---|---|---|---|---|
| 2017/0049292 | A1* | 2/2017 | Harrington | B05B 12/002 |
| 2018/0070791 | A1* | 3/2018 | Patterson | B05B 12/002 |
| 2018/0103819 | A1* | 4/2018 | Hoyle | B25G 1/10 |
| 2019/0001480 | A1* | 1/2019 | Harrington | B05B 12/002 |
| 2021/0030251 | A1* | 2/2021 | Metzel | A47L 13/254 |
| 2021/0396257 | A1* | 12/2021 | Buckley | F16B 7/1427 |
| 2022/0001528 | A1* | 1/2022 | Harrington | A47L 13/22 |

FOREIGN PATENT DOCUMENTS

| | | | | | |
|---|---|---|---|---|---|
| CN | 111973100 | A | * | 11/2020 | |
| EP | 4074236 | A1 | * | 10/2022 | A47L 13/22 |
| ES | 2206759 | T5 | * | 8/2007 | |
| WO | WO-2004080265 | A2 | * | 9/2004 | A47L 13/10 |
| WO | WO-2022094168 | A1 | * | 5/2022 | A46B 5/0045 |

* cited by examiner

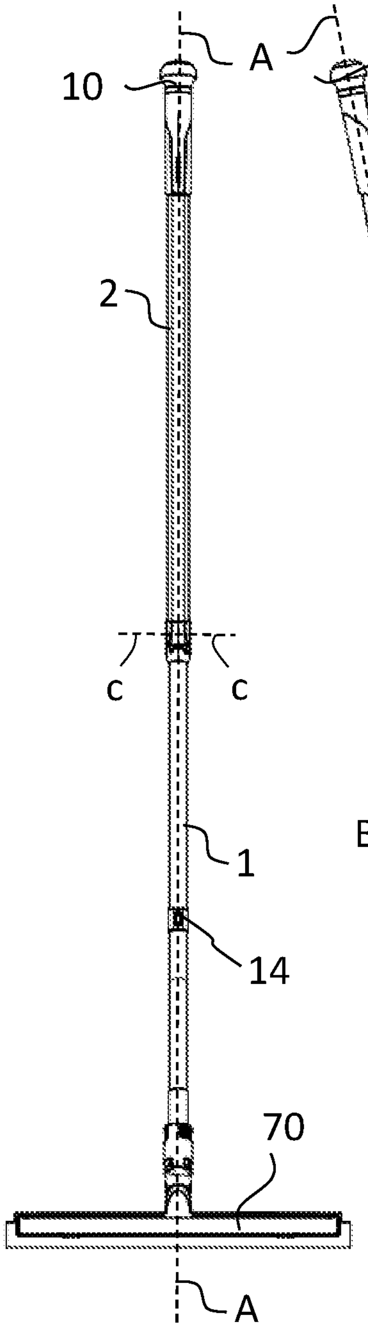
FIG. 1
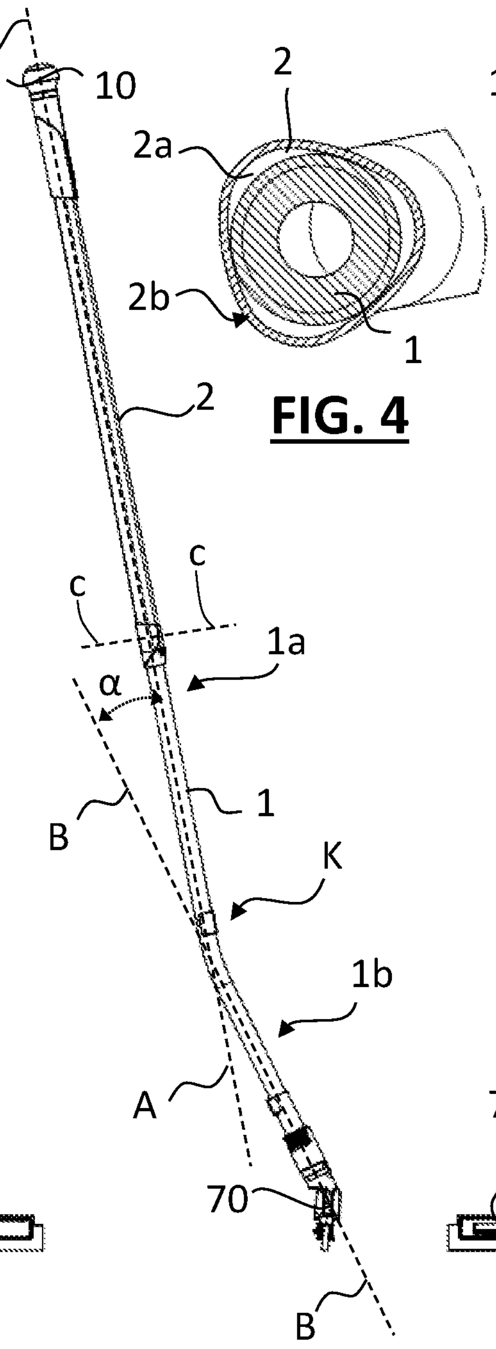
FIG. 2
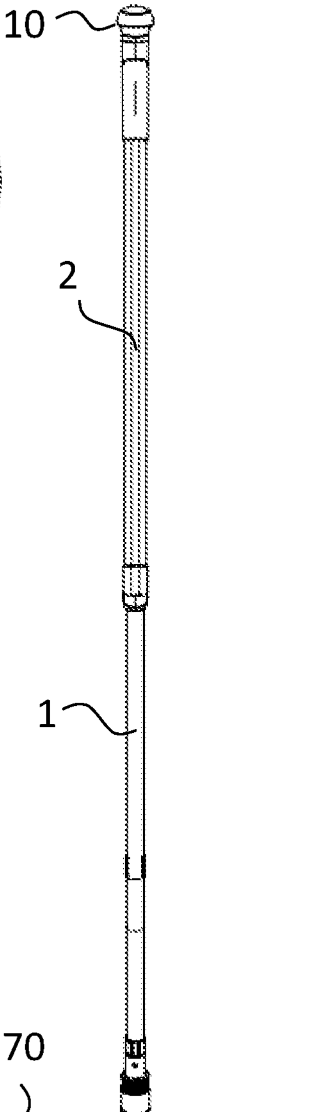
FIG. 3
FIG. 4

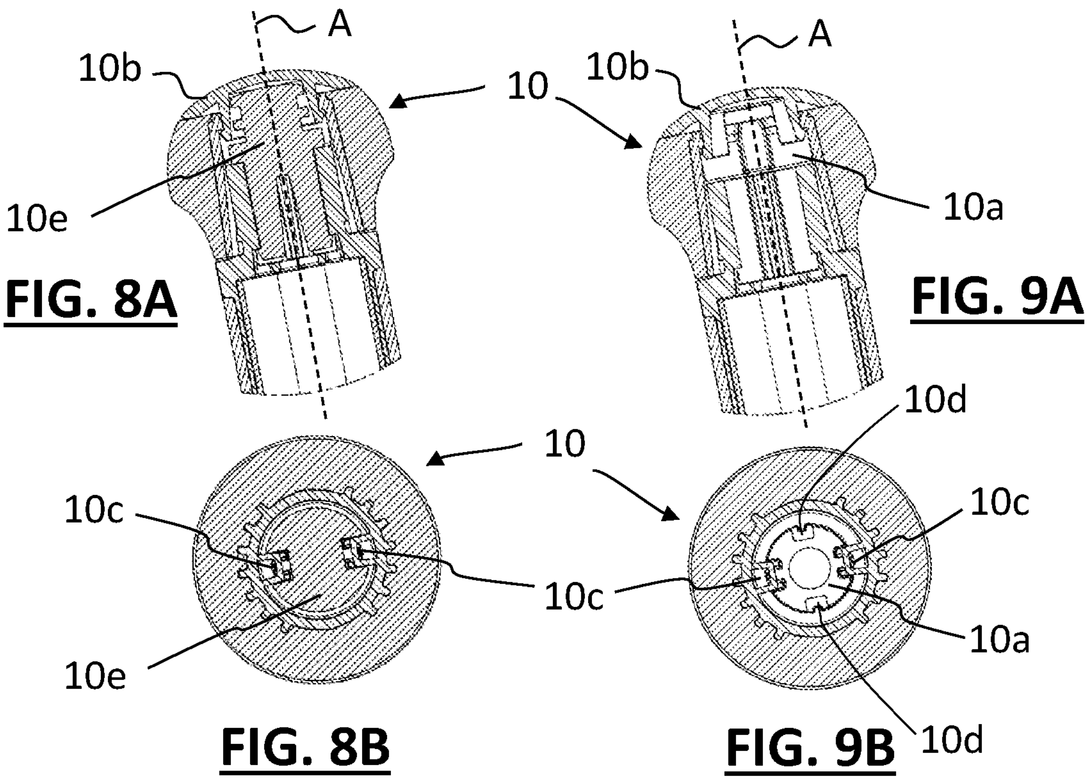
FIG. 8A
FIG. 9A
FIG. 8B
FIG. 9B
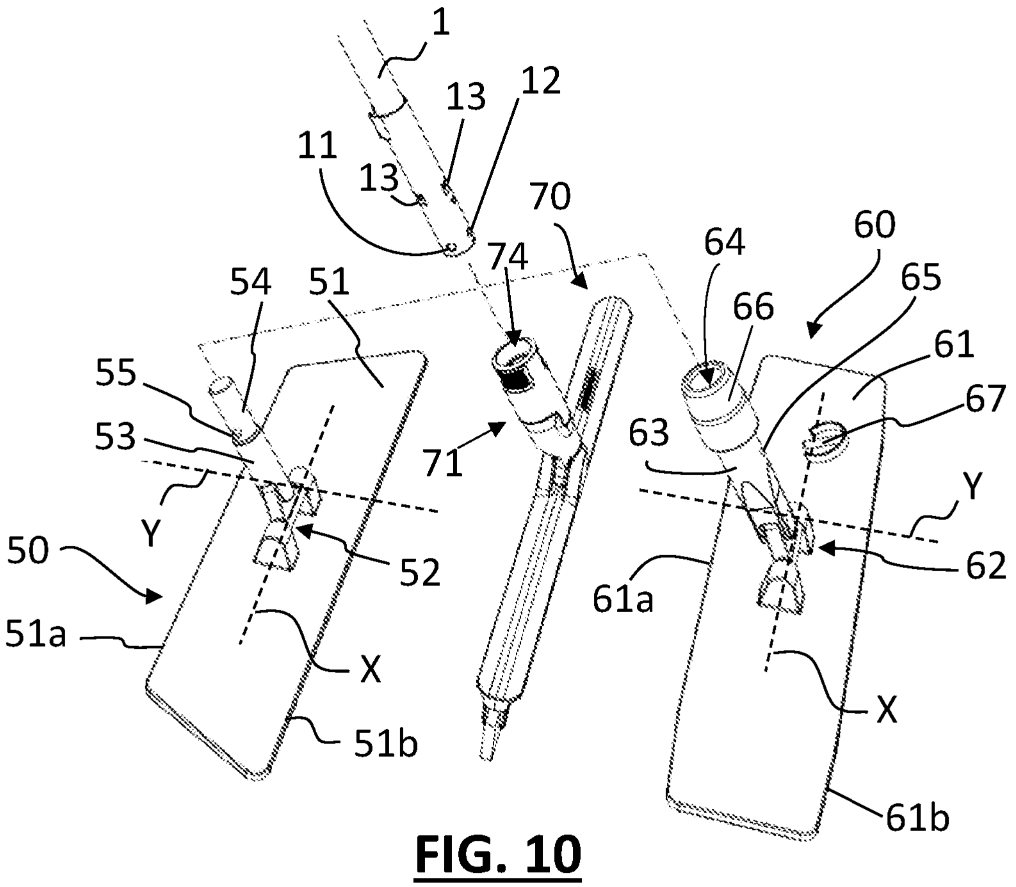
FIG. 10

SHAFT FOR A CLEANING TOOL AND A CLEANING TOOL PROVIDED WITH SUCH A SHAFT

This application claims the benefit of Belgian Patent Application No. BE2022/5155, filed Mar. 7, 2022, which is hereby incorporated by reference in its entirety.

FIELD OF THE DISCLOSURE

The present disclosure relates to a telescopic shaft for a cleaning tool, comprising a first shaft portion which is intended for fastening of a cleaning tool thereto, a second shaft portion which is slidably connected to the first shaft portion, and a spraying device for distributing a liquid cleaning agent. The present disclosure also relates to a cleaning tool provided with such a shaft, such as a floor mop or a brush.

BACKGROUND

In the case of known floor mops, the spraying device is integrated into the telescopic shaft. This spraying device comprises a holder which is provided on the shaft and in which a liquid reservoir is removably placed, a liquid line along which the liquid is conducted out of the reservoir to a spray nozzle, and a mechanism which has an open and a closed position and which can be activated by means of a knob provided on the shaft in order to spray out the liquid stream via the spray nozzle. It is thus possible, when using the floor mop, to spray cleaning liquid onto the floor surface located in the surrounding area of the floor mop. This makes it possible to clean the surface thoroughly in a simple manner. However, a disadvantage is that the shaft and the spraying device form an inseparable unit, as a result of which the shaft cannot be used without the spraying device, and the spraying device also cannot be coupled to other shafts. A first aim of the present disclosure is to provide a telescopic shaft for a cleaning tool that does not have this disadvantage.

When a floor mop with a shaft is used to clean a floor surface, it is often the case that the user, with both hands on the shaft, will move the floor mop alternately from left to right and from right to left over the floor surface in an uninterrupted movement. In this case, the floor mop is moved, for example, along a more or less S-shaped movement path over the floor surface. Due to the fact that the user, with their hands on the shaft, exerts relatively large forces with continuously changing direction on the shaft, this work is particularly exacting on the wrists of this person. In the case of other cleaning tools with a shaft, too, such use gives rise to strain on the wrists. A second aim of the present disclosure is to also remedy this disadvantage.

SUMMARY

The objectives indicated above are achieved according to embodiments of the present disclosure by providing a telescopic shaft for a cleaning tool having the features indicated in the first paragraph of this description, wherein, according to the present disclosure, the second shaft portion has, over at least part of its length, a cross section with a non-circular outer shape, and the spraying device is removably fastened to the shaft and is connected to the second shaft portion in such a way that the second shaft portion is rotatable about its longitudinal axis with respect to the first shaft portion and with respect to the spraying device fastened thereto.

As a result of the outer shape which is non-cylindrical in cross section, the user has a better grip when handling the shaft. The greater contact surface between the hands and the outer surface of the shaft means that, with the same force, a lower pressure is exerted on that surface. This reduces the load on the muscles, in particular on the muscles in the hands and at the wrist joints of the user. In this way, users suffer much less from strained wrists even in the case of prolonged and intensive use of a cleaning tool with this shaft.

Due to the fact that the spray system is removable, it is additionally also possible for the shaft to be used without the spray system, while the spray system may also be combined with a similar shaft of another cleaning tool.

Finally, the removable spray system is connected to the second shaft portion in such a way that this second shaft portion is rotatable about its longitudinal axis with respect to the first shaft portion and with respect to the spraying device. This makes it possible to bring the second shaft portion to an ideal position with respect to the spraying device, for example to a position in which the flat sides or the sides with greater radius of curvature extend in a direction which is virtually transverse to the direction of the forces being exerted on the shaft. The rotatability of the second shaft portion also makes it possible to use a widely used blocking mechanism, wherein the telescopic shaft is brought from a non-blocking state to a blocking state, and vice versa, by an axial rotation of the second shaft portion with respect to the first shaft portion.

In said blocking state, the two shaft portions are not slidable with respect to each other, such that the shaft has a fixed length. In the non-blocking state, the two shaft portions are slidable with respect to each other such that the shaft length is changeable within specified limits. The shaft portions may contain a blocking device by means of which the shaft portions can be retained only at a number of predetermined locations with respect to each other, such that only a limited number of predetermined shaft lengths are settable. The blocking device may also be designed in such a way that the one shaft portion can be retained at any location with respect to the other shaft portion, such that the shaft length is settable in a continuously variable manner.

The shaft has, for example, a first shaft portion with a cylindrical outer shape and a second shaft portion which is rectilinear and hollow, with an outer shape that has a non-round shape in cross section, or in other words has a non-circular cross section, such as a shape consisting of flat sides which adjoin each other so as to form angles, such as, inter alia, in the form of a triangle or a rectangle or a pentagon or a hexagon or a polygon, which may or may not be equilateral, regardless of the number of angles. The flat sides then preferably transition into each other via rounded transition parts. Said 'flat sides' may also be convex sides with a radius of curvature which is greater than the radius of curvature of a typical cylindrical shaft. The convex sides may also adjoin each other via rounded transition parts with a smaller radius of curvature than the radius of curvature of the convex sides. A preferred shaft has a first shaft portion which has an oval or a tri-oval outer shape in cross section. The first shaft portion is, for example, the shaft portion which is intended to be connected to the cleaning tool, and the second shaft portion is then the portion which is intended to be grasped by the hands of the user during use of the cleaning tool.

In a preferred embodiment, the telescopic shaft according to the present disclosure comprises a blocking device with a non-blocking state, in which the two shaft portions are slidable with respect to each other in their longitudinal direction, and a blocking state, in which the two shaft portions are retained in a fixed mutual position with respect to each other, and the blocking device can be brought from the non-blocking state to the blocking state, and vice versa, by an axial rotation of the shaft portions with respect to each other.

Due to the fact that the second shaft portion is rotatable about its longitudinal axis with respect to the first shaft portion and with respect to the spraying device, the blocking device can be operated as normal when the spraying device is fastened to the second shaft portion.

In a particularly advantageous embodiment, the blocking device comprises a movable retaining element which is connected to the one shaft portion and which has a friction surface, and the blocking device is intended to place the friction surface of the retaining element against a surface of the other shaft portion when the blocking device is in the blocking state, such that the two shaft portions are retained by friction with respect to each other.

Such a blocking device is very user-friendly.

The spraying device preferably comprises a first fastening element which forms a passage with a longitudinal direction, wherein the second shaft portion extends in said longitudinal direction through said passage, such that the spraying device is connected to the second shaft portion, and wherein the second shaft portion is rotatable about its longitudinal axis in the passage.

Such a fastening element forming a passage can be designed in a very simple manner, for example in the form of a closed ring or a tubular element.

In a particular embodiment of the telescopic shaft according to the present disclosure, the first fastening element comprises an access opening, which extends over the length of the passage, in the lateral delimitation of the passage, and the passage is laterally accessible via said access opening, such that the second shaft portion can be brought, in a position in which its longitudinal axis is virtually parallel to the longitudinal direction of the fastening element, into the passage via the access opening in order to connect the spraying device to the second shaft portion.

It is of course also possible for the second shaft portion to be brought into the passage via the access opening by moving the fastening element with respect to the second shaft portion. The second shaft portion is preferably brought into the passage by a relative movement of the fastening element and the second shaft portion in a direction which is virtually transverse to said longitudinal direction and longitudinal axis.

It is thus possible for the fastening element to be placed onto the second shaft portion very easily. Such a fastening element is very simple and, in addition, provides a particularly reliable fastening. The wall delimiting the passage preferably has a substantially cylindrical surface facing toward the passage. Preferably, the first fastening element has the shape of an open ring, a clasp with a U-shaped profile or a tubular element which is open on one side over the entire length.

In a preferred embodiment, the wall delimiting the passage is elastically deformable, such that the interruption via which the passage is laterally accessible can be widened so as to allow the second shaft portion to easily pass through and can—once the second shaft portion is in the passage—then return to the non-deformed state, in which it is located around the second shaft portion. This makes it possible for the spraying device to be connected to the second shaft portion by very simple means and in a very simple and user-friendly manner.

In a particularly preferred embodiment, that part of the second shaft portion which is located in the passage has an outer shape with a non-circular cross section, while the passage is laterally delimited by a wall of the fastening element, said wall being substantially cylindrical with a diameter which is at least approximately equal to the diameter of the circle described around the non-circular cross section of the second shaft portion, such that the second shaft portion can rotate about its longitudinal axis in the passage.

The diameter of the cylindrical delimiting wall of the passage is preferably somewhat greater than the diameter of the described circle, such that, on the one hand, there is a small amount of clearance permitting the rotation of the second shaft portion, and, on the other hand, it is still possible to establish a stable connection between the spraying device and the second shaft portion.

Preferably, the spraying device is fastened to the first shaft portion by means of a second fastening element, such that the first shaft portion is connected to the spraying device in a rotationally fixed manner. The position of the spraying device with respect to the shaft is thus secured during the use of the cleaning tool.

In a most preferred embodiment, the second shaft portion has, over at least part of its length, an oval or a tri-oval outer shape. Such a shaft offers the user excellent grip with a minimal load on the wrists. In addition, such a shaft also has a more attractive appearance than a conventional cylindrical shaft.

In another particularly preferred embodiment of the telescopic shaft, an end piece is fastened to the upper end of the shaft, and the end piece is rotatable with respect to the shaft about an axis which virtually coincides with the longitudinal axis of the shaft, and the telescopic shaft comprises a stop element in order to place the end piece in a rotatable state or a non-rotatable state as desired.

The end of the second shaft portion preferably forms the upper end of the shaft. The end piece preferably comprises a holder which the user can easily grasp with one hand during the use of the cleaning tool and which is, for example, more or less spherical. Said stop element is, for example, designed as a blocking piece which can be placed in the second shaft portion, or can be fastened to the second shaft portion, in a position in which it prevents the rotation of the end piece. The end piece is thus in the non-rotatable state. By removing the stop element, the rotation of the end piece is no longer prevented and the end piece is in the rotatable state.

In a particular embodiment, the first shaft portion comprises two virtually rectilinear pieces which adjoin each other by way of a curve. The two rectilinear pieces extend in different directions, wherein the one direction forms an angle ($\alpha$) of at least 10° and at most 30°, preferably approximately 15°, with respect to the other direction.

Preferably, said first shaft portion, in all the embodiments mentioned above, is the shaft portion which is intended for fastening of the cleaning tool thereto, while said second shaft portion, in all the embodiments mentioned above, is slidably connected to the first shaft portion and is intended to be grasped with the hands during the normal use of the cleaning tool.

The present disclosure also relates to a cleaning tool which is connected to a telescopic shaft with one or more of the features indicated above in this description and in the claims.

For this purpose, the first shaft portion is provided with coupling means which are intended to cooperate with corresponding coupling means provided on the cleaning tool. The connection between the first shaft portion and the cleaning tool is preferably effected by means of a connecting piece which allows the first shaft portion to be pivotable with respect to the cleaning tool, preferably so as to be pivotable about an axis which, when using the cleaning tool to clean a surface, runs virtually parallel to the surface. It is additionally also possible for the connecting piece to be designed in such a way that the shaft portion is rotatable about an axis which virtually coincides with the longitudinal axis of the shaft.

This makes it possible to move a cleaning tool, such as a floor mop, in a continuous movement laterally back and forth—from left to right and vice versa, for example along an S-shaped movement path—over a floor surface to be cleaned, while only the position of the floor mop changes and the position of the shaft in the hands remains unchanged. This increases the ease of use and reduces the load on muscles and joints.

Preferably, the first shaft portion is provided with a first coupling means and a second coupling means which differs therefrom, the first coupling means is intended to cooperate with a third coupling means provided on a first cleaning tool, and the second coupling means is intended to cooperate with a fourth coupling means provided on a second cleaning tool. The first and the second coupling means are a pair of cooperating coupling means of a first type, while the second and the fourth coupling means are a pair of cooperating coupling means of a second type. It is thus possible for the same shaft to be coupled, as desired, to the first or to the second cleaning tool in spite of the fact that these cleaning tools are provided with coupling means of different types.

Even more preferably, the first shaft portion is provided with three different coupling means which are intended to cooperate with respective mutually different coupling means provided on a first, a second and a third cleaning tool. It is thus possible for the same shaft to be coupled, as desired, to the first or to the second or to the third cleaning tool in spite of the fact that these three cleaning tools are provided with coupling means of different types.

The cleaning tool according to the present disclosure is preferably a cleaning tool for cleaning a surface, such as a floor mop, a brush or a floor wiper.

BRIEF DESCRIPTION OF THE DRAWINGS

The present invention will now be explained in more detail by means of the following more detailed description of possible embodiments of a telescopic shaft for a cleaning tool according to the present invention.

It should be made clear that nothing in the following description should be regarded as a limitation of the scope of protection for the present invention, as defined in the attached claims, or of the area of application of the present invention.

Figure 5:
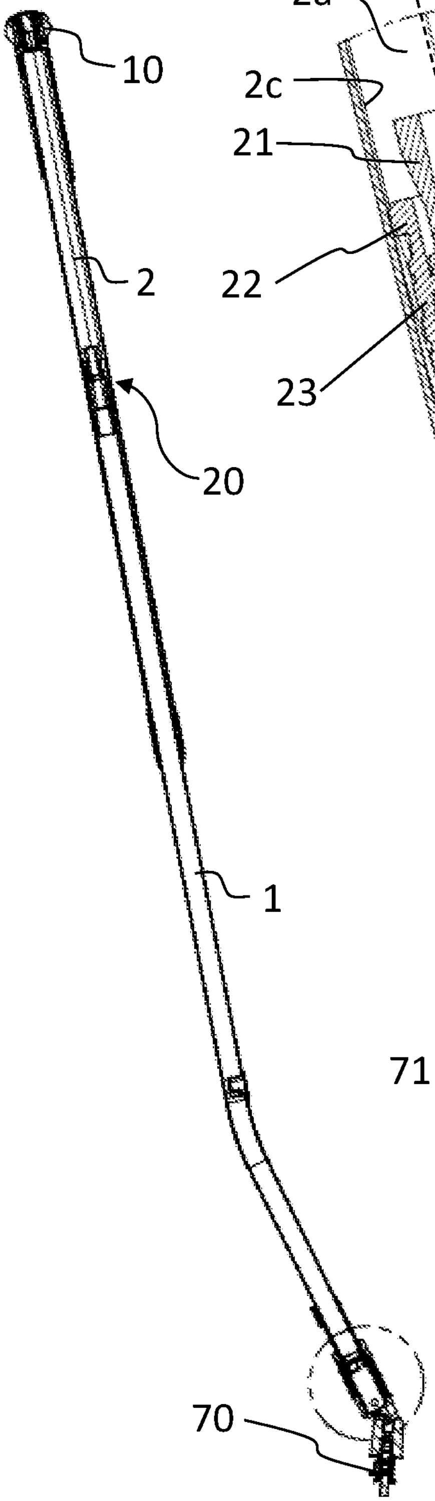
Figure 6:
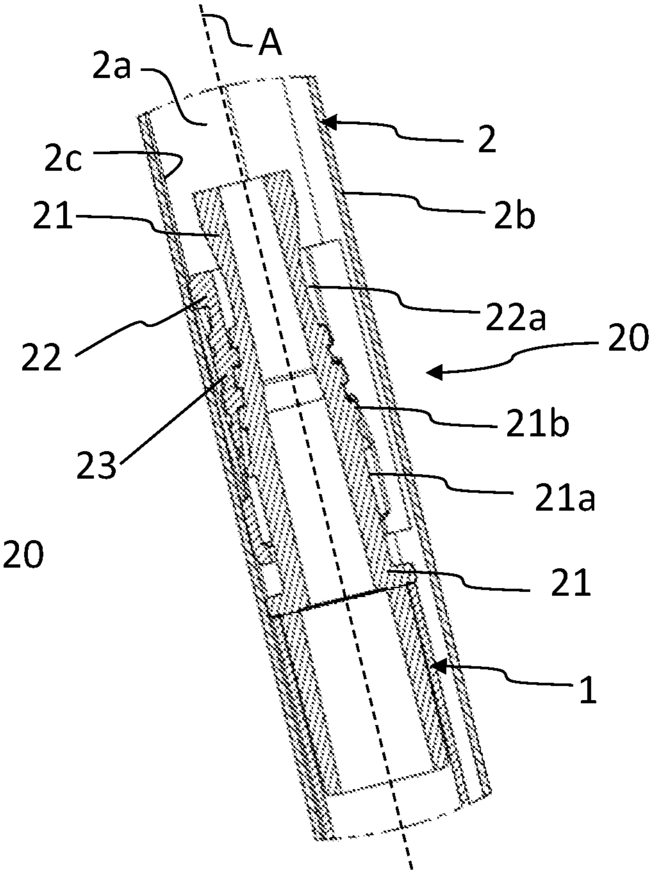
Figure 7:
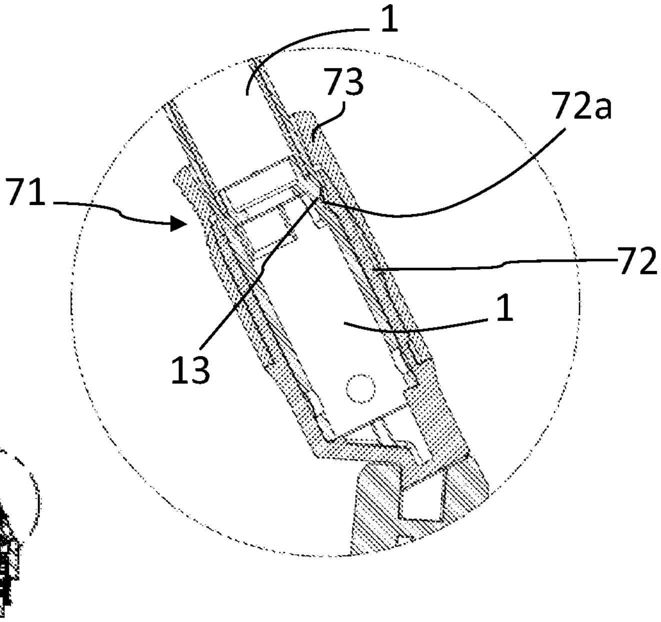
Figure 13:
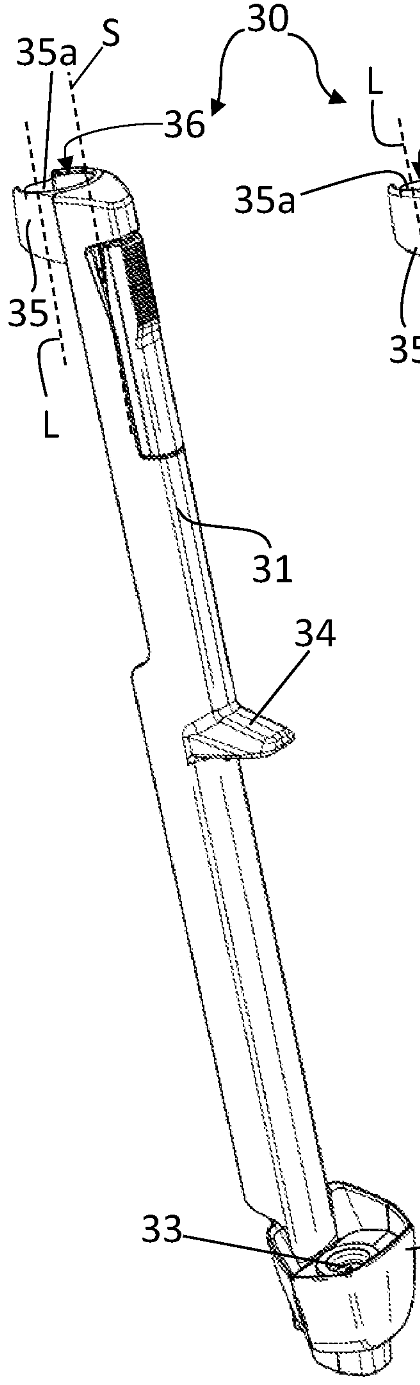
Figure 12:
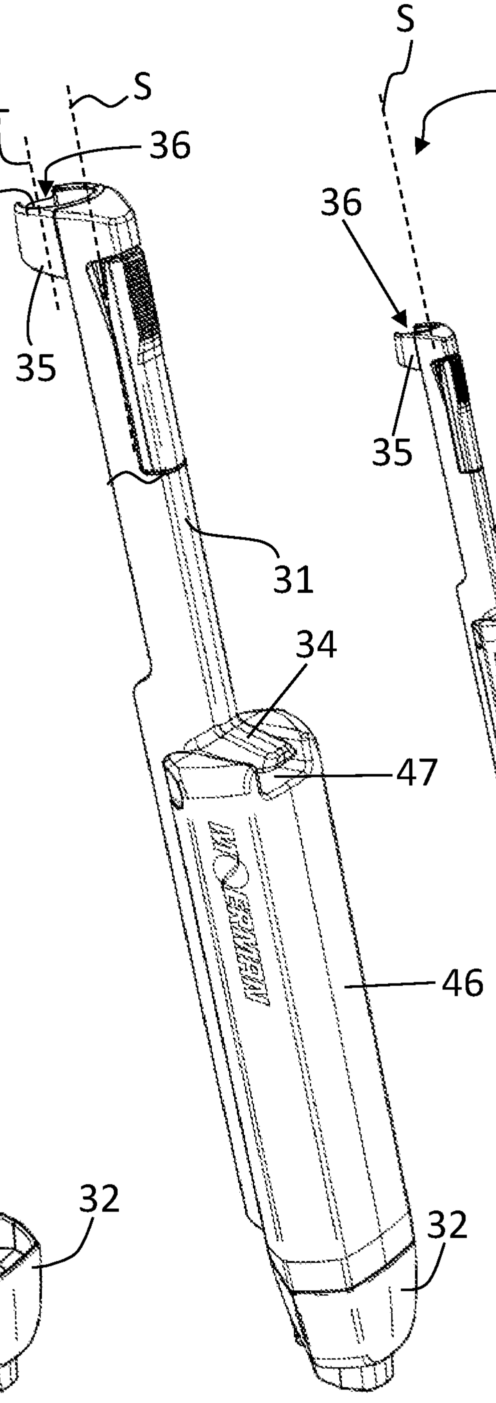
Figure 11:
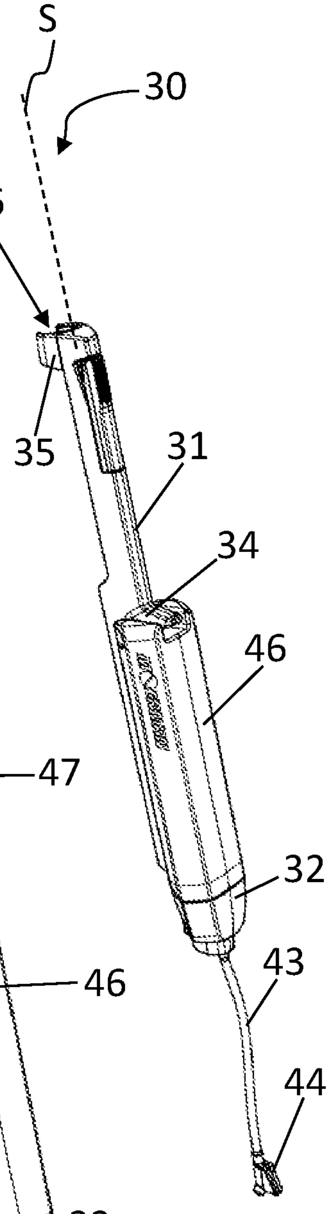
Figure 14:
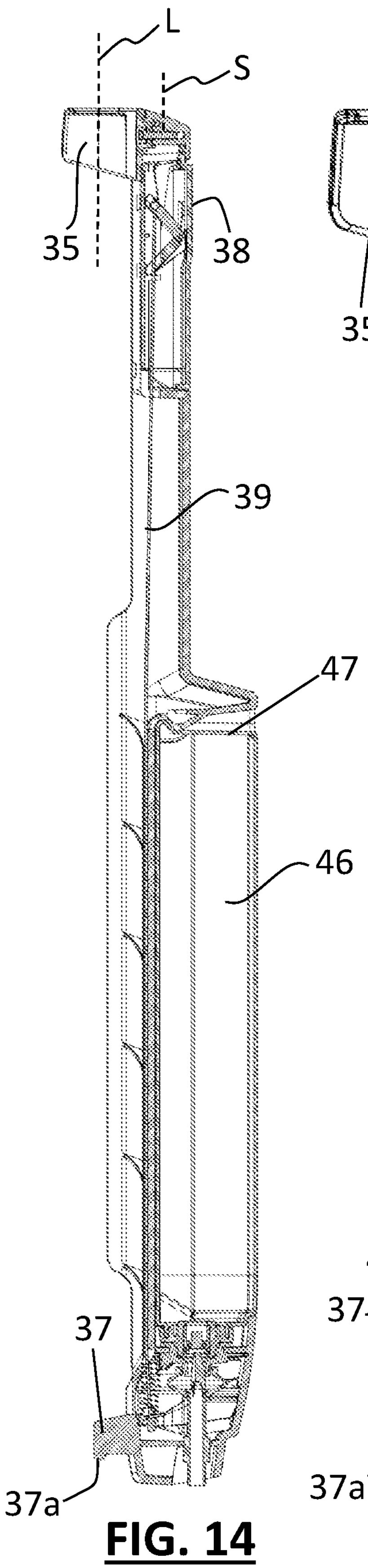
Figure 15:
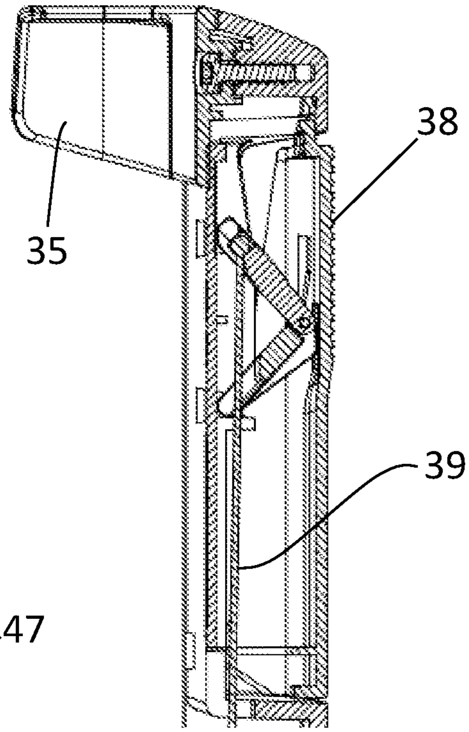
Figure 16:
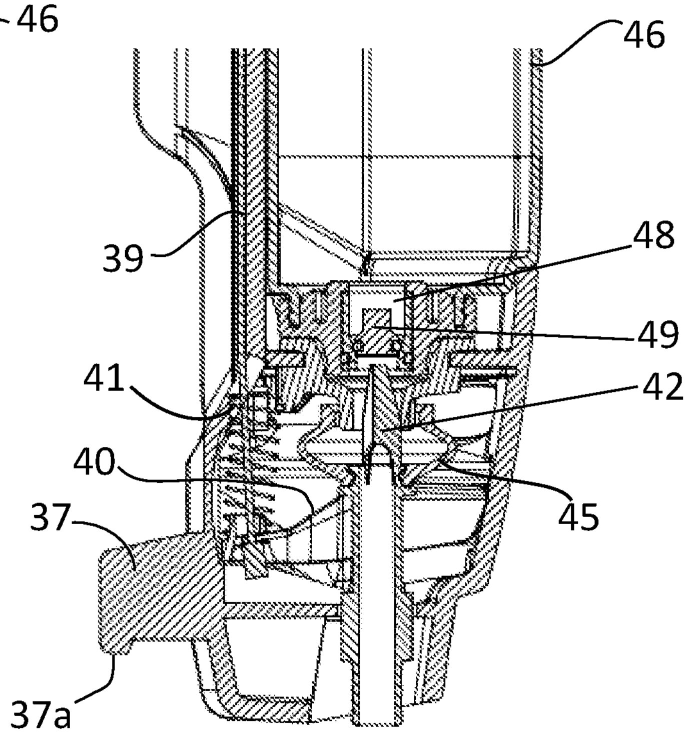

Reference numerals are used in this detailed description to refer to the attached figures, in which:

FIGS. 1, 2 and 3 are a front view, a side view and a rear view, respectively, of a floor wiper provided with a telescopic shaft according to at least one embodiment of the present disclosure, FIG. 4 is a cross section, along line C-C indicated in FIG. 2, of the telescopic shaft, FIG. 5 is a side view of a floor wiper provided with the telescopic shaft, FIG. 6 is a longitudinal cross section of the blocking mechanism in the telescopic shaft of FIG. 5, FIG. 7 shows a longitudinal cross section of that portion of the shaft which is circled in FIG. 5 and the connecting piece by means of which the shaft is fastened to the floor wiper, FIG. 8A shows a longitudinal cross section of the upper end of the telescopic shaft while the end piece is in the non-rotatable state, FIG. 8B shows a transverse cross section of the upper end of the telescopic shaft while the end piece is in the non-rotatable state, FIG. 9A shows a longitudinal cross section of the upper end of the telescopic shaft while the end piece is in the rotatable state, FIG. 9B shows a transverse cross section of the upper end of the telescopic shaft while the end piece is in the rotatable state, FIG. 10 is a perspective depiction of the lower part of the first shaft portion and of three cleaning tools with different types of coupling means which can be coupled to the first shaft portion, FIG. 11 is a perspective depiction of the spraying device of the telescopic shaft, FIG. 12 is a perspective depiction of the upper portion of the spraying device of FIG. 11, FIG. 13 is a perspective depiction of the upper portion of the spraying device of FIG. 11, without the liquid reservoir, FIG. 14 is a longitudinal cross section of the upper portion of the spraying device of FIG. 11, FIG. 15 depicts the upper part of the longitudinal cross section of FIG. 14 in enlarged form, and FIG. 16 depicts the lower part of the longitudinal cross section of FIG. 14 in enlarged form.

DETAILED DESCRIPTION

The telescopic shaft according to the present disclosure (see FIGS. 1 to 3) comprises two shaft portions (1), (2) which are connected to each other in a telescopically slidable manner. The first shaft portion (1) is tubular with a cylindrical outer shape and is curved and consists of two virtually rectilinear pieces (1*a*), (1*b*) which adjoin each other by means of an intermediate piece with a curve (K). The lower piece (1*b*), to which a floor wiper (70) is connected, has a longitudinal axis (B). The upper piece (1*a*) has a longitudinal axis (A) which forms an angle ($\alpha$) of approximately 15° with respect to the longitudinal axis (B) of the lower piece (1*b*).

The second shaft portion (2) is hollow and has an inner space (2*a*) which is accessible from an open end, and an outer surface (2*b*) which is substantially tri-oval as seen in cross section (see FIG. 4), while the first shaft portion (1) is located partially in the inner space (2*a*) and protrudes partially via the open end thereof, such that both shaft portions (1), (2) extend in line with each other and together form the shaft (1, 2). The first shaft portion (1) is slidable in the inner space (2*a*) of the second shaft portion (2) in the longitudinal direction of the shaft with respect to the second shaft portion (2), such that the length of the shaft (1, 2) is changeable.

The lower piece (1*b*) of the first shaft portion (1) has, in the vicinity of the end thereof (see FIG. 10), two diametrically opposite fixing openings (11) in the tubular wall. At a location which is situated approximately in the middle between these fixing openings (11), an insertion opening (12) is also provided in this tubular wall. The function of these openings (11), (12) will be explained in more detail.

Three cleaning tools are depicted in FIG. 10. The left-hand cleaning tool and the right-hand cleaning tool are floor mops (50), (60). The middle cleaning tool is a floor wiper (70).

The floor mops (50), (60) have an upper surface (51), (61) and a lower surface (not visible in the figures) which is substantially flat and is in the form of a rectangle or a trapezium. The lower surface is intended for fastening of a cleaning cloth thereon. The upper surface (51), (61) and the lower surface extend in virtually parallel planes.

The floor mops (50), (60) are connected at the upper surface (51), (61) to a respective connecting piece (53), (63) by means of a pivot connection (52), (62). The pivot connection (52), (62) has two pivot axes (X), (Y) which extend in respective planes that run virtually parallel to the upper surface (51), (61) of the floor mop (50), (60), wherein the one axis (X) is approximately parallel to the two long sides (51*a*), (51*b*); (61*a*), (61*b*) of the upper surface (51), (61) and the other axis (Y) is virtually perpendicular to these long sides (51*a*), (51*b*); (61*a*), (61*b*).

The connecting piece (53) of the floor mop (50) depicted on the left comprises a cylindrical attachment piece (54) on which, at two diametrically opposite locations, pins (55) are provided. These pins (55) sit in respective openings (not visible) and are urged by a respective internal spring (not visible) to a 'protruding position' protruding in the radial direction past the outer surface of the attachment piece (54). The pins (55) can be pushed, counter to this spring force, into the openings in the attachment piece (54) to a 'pushed-in position' in which they protrude to a lesser extent—in comparison with the protruding position—with respect to the outer surface of the attachment piece (54).

The lower end of the first shaft portion (1) can be pushed over the attachment piece (54) of the floor mop (50), such that the attachment piece (54) is located in the hollow inner space of the first shaft portion (1). In this case, said pins (55) are first brought to the 'pushed-in position'. When said fixing openings (11) in the wall of the first shaft portion (1) are located opposite the pins (55), these pins (55) can return to their 'protruding position'.

The connecting piece (63) of the floor mop (60) depicted on the right comprises an open internal hollow space (64) into which the end of the first shaft portion (1) can be introduced. Provided on the front side of the connecting piece (63) is an opening (65) which opens out into the internal hollow space (64), and which is located opposite the above-mentioned insertion opening (12) of the first shaft portion (1). By placing an insertion pin (67) in the opening (65) in the connecting piece (63) in such a way that the insertion pin (67) is furthermore also located in the insertion opening (12) in the wall of the first shaft portion (1), the first shaft portion (1) is retained in the hollow space (64). Furthermore, the connecting piece (63) also comprises a clamping system which comprises an elastically deformable clamping wall (not visible in the figures), and a screw cover (66) which is intended to deform the clamping wall in the radial direction until said wall is pushed against the outer wall of the first shaft portion (1) located in the hollow space. The rotation of the screw cover (66) pushes the clamping wall against the outer wall of the first shaft portion (1) in such a way that the first shaft portion (1) is very firmly retained in the hollow space (64) of the connecting piece (63).

The cleaning tool depicted in the middle in FIG. 10 is a floor wiper (70) with a connecting piece (71) in which an open internal hollow space (74) is provided, into which the end of the first shaft portion (1) can be introduced. The first shaft portion (1) is provided with three notches (13), of which only two are visible in FIG. 10. The notches (13) are distributed uniformly around the circumference of the first shaft portion (1).

The connecting piece (71) comprises (see FIG. 7) a cylindrical sleeve (72) which is connected to the floor wiper (70) and which has an inner wall in which three protrusions (72*a*) are provided, distributed around the circumference. The first shaft portion (1) is introduced into the opening (74) in such a way that said three protrusions (72*a*) are located opposite a respective notch (13) of the first shaft portion (1). Furthermore, the connecting piece (71) also comprises an attachment cover (73) which is intended to be pushed over the sleeve (72) to a fixing position in which the sleeve (72) is located in the inner space of the attachment cover (73). The inner dimensions of the attachment cover (73) are such that the inner wall of the attachment cover (73) brought to the fixing position then pushes against the outer wall of the sleeve (72) and deforms this outer wall in such a way that the protrusions (72*a*) are located in the notches (13) and can no longer exit these notches (13). The attachment cover (73) is held in the fixing position on the sleeve (72) by virtue of the fact that a small cam provided on the inner side of the attachment cover (73) engages into a cavity provided in the outer wall of the sleeve (72)—not indicated in the figures. The small cam is brought into the cavity by an axial rotation of the attachment cover (73) brought to the fixing position, and can be removed from the cavity again by a rotation in the opposite direction of rotation.

Provided at the upper end of the second shaft portion (2) is a manual knob (10) (see FIGS. 8A, 8B, 9A, and 9B) which is connected to the second shaft portion (2) in such a way that the manual knob (10) is rotatable about the longitudinal axis (A) of the shaft (1), (2). Provided in the manual knob (10) is an inner space (10*a*) which is accessible from the top and which is closed by a small cover cap (10*b*). The rotatable manual knob (10) comprises two first cams (10*c*) which are diametrically opposite each other in the inner space (10*a*) and rotate conjointly with the rotatable manual knob (10). Two second cams (10*d*) are also provided in said inner space (10*a*) and are connected to the first shaft portion (1) and thus do not rotate conjointly with the manual knob (10). The first cams (10*c*) and the second cams (10*d*) have virtually the same dimensions and comprise side walls which extend in diametrically opposed fashion in the inner space. The first cams (10*c*) and the second cams (10*d*) are located at a different level above each other in the inner space (10*a*), such that the second cams do not prevent the free rotation (through 360°) of the knob (10). The manual knob (10) is then in the rotatable state depicted in FIGS. 9A and 9B.

The shaft (1, 2) according to the present disclosure also comprises (see FIG. 8) an insertion element (10*e*) with a volume that fits into the inner space (10*a*) when the first cams (10*c*) and the second cams (10*d*) are located above each other. When the insertion element (10*e*) has been placed in the inner space (10*a*), the first cams (10*c*) are retained in a fixed position with respect to the second cams (10*d*), such that the knob (10) cannot rotate. The manual knob (10) is then in the non-rotatable state depicted in FIGS. 8A and 8B.

A blocking device (20) is provided in the hollow space (2*a*) of the second shaft portion (2), by means of which the two shaft portions (1), (2) can be placed in a non-blocking state, in which they are slidable with respect to each other, and in a blocking state, in which they are retained in a fixed mutual position with respect to each other. This makes it possible to change the shaft length in a continuously variable manner.

The blocking device (20) comprises two components (see FIG. 6), a screw body (21) and a blocking body (22). The screw body (21) is connected to the first shaft portion (1) and extends from the end of the first shaft portion (1) along the longitudinal axis (A) of the shaft and comprises a conical outer surface (21*a*) on which an external screw thread (21*b*) is provided.

The blocking body (22) is provided in the inner space of the second shaft portion (2). The blocking body (22) comprises a central hollow space (22*a*) which is laterally delimited by three wings (23) which are movable in the radial direction by elastic deformation, and is provided with an internal screw thread which engages with the external screw thread (21*b*) of the conical screw body (21). By rotating the second shaft portion (2) about its longitudinal axis (A) with respect to the first shaft portion (1), the blocking body (22) is conjointly rotated with respect to the screw body (21), such that the blocking body (22) is moved, by way of the screw thread, in the longitudinal direction (A) of the shaft (1), (2). The diameter of the conical screw body (21) increases in the direction of the second shaft portion (2). By rotating the second shaft portion (2) in such a way that the conjointly rotating blocking body (22) is moved in the direction of the second shaft portion (2) on the screw body (21), the diameter of that part of the screw body (21) which sits in the blocking body (22) becomes gradually greater and, as a result, the wings (23) of the blocking body (22) are pushed away from each other in the radial direction. Eventually, the wings (23) are pushed against the inner wall (2*c*) of the second shaft portion (2). The surface of at least one of the wings (23) in contact with the inner wall (2*c*) of the second shaft portion (2) is provided with a layer of compressible material which has a high frictional resistance with respect to the surface of the inner wall (2*c*), such as a thermoplastic elastomer. As a result of this friction, the second shaft portion (2) can no longer be moved along the longitudinal axis (A) with respect to the first shaft portion (1). This makes it possible to set the shaft length to a fixed length.

By rotating the second shaft portion (2) in the other direction of rotation with respect to the first shaft portion (1), the blocking body (22) is moved in the direction of the decreasing diameter of the screw body (21), and, as a result, the wings (23) of the blocking body (22) can move back towards each other in the radial direction. In this way, the wings (23) are no longer in contact with the inner wall (2*c*) of the first shaft portion (1), and the two shaft portions (1), (2) can be moved freely with respect to each other, and the shaft length can be adjusted in a continuously variable manner.

The spraying device (30) is depicted separately in FIGS. 11 to 16 and comprises an elongate holder (31) made of plastic with a longitudinal axis (S). The rear side of the holder (31) has a concave surface which is intended to abut against the first shaft portion (1) and the second shaft portion (2) in a position in which the longitudinal axes (A), (S) of the shaft and the holder (31) are substantially parallel. Provided at the bottom on the front side of the holder (30) is a substantially bowl-like supporting element (32) with a supporting surface for a liquid reservoir (46). An opening (33) is provided in the supporting surface.

The holder (31) also comprises an arm (34) which protrudes at an intermediate distance above the bowl-like supporting element (32). A liquid reservoir (46) has, on the underside, an outflow opening (48) with a valve (49) which can be placed in an open position and in a closed position by means of operating means (38-42) which will be discussed further in this description, and a top side (47). The reservoir (46) is intended to be placed in a use position (see FIGS. 11, 12 and 14) in which its underside is supported in the bowl-like supporting element (32) while its top side (47) is connected to the arm (34) by means of a manually releasable click-fit connection. In the use position, the outflow opening (48) of the reservoir (46) adjoins the opening (33) in the supporting surface.

At the top, the holder (31) has an open ring (35) which protrudes from the rear side and which has cylindrical inner walls that delimit a passage (36). At the bottom, a connecting piece (37) with a downwardly directed projection (37*a*) is provided on the rear side of the holder (31). The first shaft portion (1) has, in the front side, an insertion opening (14) which is intended for insertion of said projection (37*a*).

In order to connect the holder (31) to the telescopic shaft (1, 2), the projection (37*a*) is placed in the insertion opening (14) of the first shaft portion (1), and the second shaft portion (2) is brought into the passage (36) via the open side (35*a*) of the open ring (35). The inner diameter of the open ring (35) is such that the second shaft portion (2) with the tri-oval outer shape is rotatable about its longitudinal axis (A) in the passage (36). This makes it possible for the blocking device (20) of the telescopic shaft to be brought from the blocking state to the non-blocking state, and vice versa, in order to change the shaft length, while the spraying device (30) is connected to the shaft (1, 2).

At the top on the front side, the holder (31) is provided with an operating button (38) which is connected to a plunger bridge (40) by means of a cable (39). By pushing in the operating button (38), the plunger bridge (40) is moved upwards counter to the spring force of a spiral spring (41), as a result of which a plunger (42) is also moved upwards into the outflow opening (48) and, as a result, the valve (49) of the reservoir (46) is brought from the closed position to the open position.

A flexible line (43) has a lower end which adjoins a spraying element (44) with spray openings which is intended to be fastened to the second shaft portion (2), such that, during the use of the cleaning tool, cleaning liquid can be sprayed onto the surface to be cleaned. A flexible bellows (45), which is moved back and forth with the plunger (42), is provided around the upper end of the flexible line (43). When the operating button (38) has been pushed in and the plunger (42) has moved upwards into the outflow opening (48) of the reservoir (46) and the valve (49) has, as a result, been brought to the open position, the upper edges of the flexible bellows (45) abut against the wall in which the opening (33) opens out, with the result that a watertight seal is realized. Cleaning liquid then flows out of the reservoir (46) into the line (43). When the operating button (38) is released again, the spring (41) ensures that the operating button (38) returns to its original position and that the plunger bridge (40) and the plunger (42) are moved downwards. In this way, the valve (49) returns to the closed position and cleaning liquid no longer flows out of the reservoir (46). The bellows (45) is also moved downwards and the edges thereof no longer abut against the wall around the opening (33), with the result that the liquid in the line drains out of the line (43) via the spray openings under the influence of the air pressure. In this way, no cleaning liquid can remain in the line (43) after the spraying device (30) has been operated.

The invention claimed is:

1. A telescopic shaft for a cleaning tool, comprising:

a first shaft portion for fastening of a cleaning tool thereto, a second shaft portion which is slidably connected to the first shaft portion, and a spraying device for distributing a liquid cleaning agent, the spraying device comprising a first fastening element which defines a passage extending in a longitudinal direction (L), wherein the second shaft portion has, over at least part of its length, a cross section with a non-circular outer shape, wherein the spraying device is removably connected to the second shaft portion, the second shaft portion is-being rotatable about a longitudinal axis (A) of the second shaft portion with respect to the first shaft portion and with respect to the spraying device fastened thereto, and wherein the second shaft portion extends in the longitudinal direction (L) through the passage, such that the spraying device is connected to the second shaft portion, and wherein the second shaft portion is rotatable about its longitudinal axis (A) in the passage.

2. The telescopic shaft for a cleaning tool according to claim 1, wherein the telescopic shaft comprises a blocking device with a non-blocking state, in which the first and the second shaft portions are slidable with respect to each other in their longitudinal direction, and a blocking state, in which the first and the second shaft portions are retained in a fixed mutual position with respect to each other, and wherein the blocking device can be brought from the non-blocking state to the blocking state, and vice versa, by an axial rotation of the first and the second portions with respect to each other.

3. The telescopic shaft for a cleaning tool according to claim 2, wherein the blocking device comprises a movable retaining element which is connected to one of the first and the second shaft portions and which has a friction surface, the movable retaining element for placing the friction surface against a surface of another of the first and the second shaft portions when the blocking device is in the blocking state, such that the first and the second shaft portions are retained by friction with respect to each other.

4. The telescopic shaft for a cleaning tool according to claim 1, wherein a part of the second shaft portion which is located in a passage has an outer shape with a non-circular cross section, wherein the passage is laterally delimited by a cylindrical wall of a first fastening element, a diameter of the wall being at least approximately equal to a diameter of the circle described around the non-circular cross section of the second shaft portion, such that the second shaft portion can rotate about its longitudinal axis (A) in the passage.

5. The telescopic shaft for a cleaning tool according to claim 1, wherein the spraying device is fastened to the first shaft portion by a second fastening element, wherein the first shaft portion is connected to the spraying device in a rotationally fixed manner.

6. The telescopic shaft for a cleaning tool according to claim 1, wherein the second shaft portion has, over at least part of its length, an oval or tri-oval outer shape.

7. The telescopic shaft for a cleaning tool according to claim 1, wherein an end piece is fastened to the upper end of the telescopic shaft, and wherein the end piece is rotatable with respect to the telescopic shaft about an axis which virtually coincides with the longitudinal axis (A) of the shaft, and wherein the telescopic shaft comprises a mechanism to place the end piece in a rotatable state or a non-rotatable state as desired.

8. The telescopic shaft for a cleaning tool according to claim 1, wherein the first shaft portion comprises two virtually rectilinear end pieces which adjoin each other by way of a curve.

9. A cleaning tool, wherein the cleaning tool is connected to a telescopic shaft according to claim 1.

10. The cleaning tool according to claim 9, wherein the cleaning tool is a cleaning tool for cleaning a surface.

11. The cleaning tool according to claim 10, wherein the cleaning tool is a floor mop, a brush, or a floor wiper.

12. A telescopic shaft for a cleaning tool, comprising:

a first shaft portion for fastening of a cleaning tool thereto, a second shaft portion which is slidably connected to the first shaft portion, and a spraying device for distributing a liquid cleaning agent, wherein the second shaft portion has, over at least part of its length, a cross section with a non-circular outer shape, wherein the spraying device is removably connected to the second shaft portion, the second shaft portion being rotatable about a longitudinal axis (A) of the second shaft portion with respect to the first shaft portion and with respect to the spraying device fastened thereto, wherein a first fastening element comprises an access opening, which extends over the length of a passage, in the lateral delimitation of the passage, wherein the passage is laterally accessible via the access opening, such that the second shaft portion can be brought, in a position in which its longitudinal axis (A) is substantially parallel to a longitudinal direction (L) of the first fastening element, into the passage via the access opening in order to connect the spraying device to the second shaft portion.

* * * * *